United States Patent [19]
Sweeney et al.

[11] 3,743,218
[45] July 3, 1973

[54] SEMI-RIGID AIRFOIL FOR AIRBORNE VEHICLES

[75] Inventors: Thomas E. Sweeney, Princeton, N.J.; Philip M. Condit, Mercer Island, Wash.; Robert A. Ormiston, Mountainview, Calif.; Walter Barry Nixon, Trenton, N.J.

[73] Assignee: Thomas E. Sweeney, Princeton, N.J.

[22] Filed: May 19, 1971

[21] Appl. No.: 144,861

Related U.S. Application Data

[62] Division of Ser. No. 740,895, June 28, 1968, Pat. No. 3,599,904.

[52] U.S. Cl. ................... 244/36, 244/49, 244/7 C
[51] Int. Cl. ..................... B64c 1/00, B64c 3/56
[58] Field of Search .................. 244/36, 43, 44, 46, 244/49, 138, 139

[56] References Cited
UNITED STATES PATENTS

| | | |
|---|---|---|
| 3,599,904 | 8/1971 | Condit et al. ............... 244/46 |
| 3,273,828 | 9/1966 | James ........................ 244/43 |
| 3,614,032 | 10/1971 | Purcell, Jr. ................. 244/36 |
| 3,446,458 | 5/1969 | Rogallo ...................... 244/43 |
| 3,197,158 | 7/1965 | Rogallo ...................... 244/49 |
| 3,194,514 | 7/1965 | Rogallo ...................... 244/49 |

Primary Examiner—Milton Buchler
Assistant Examiner—Carl A. Rutledge
Attorney—Michael W. York

[57] ABSTRACT

The present invention relates to a semi-rigid airfoil for use with airborne vehicles and capable of being folded and/or warped. The airfoil includes a rigid spar defining a leading edge and a cable defining the trailing edge with the root end thereof secured to the fuselage of the vehicle and the other end to a tip truss structure, with a flexible material forming top and bottom airfoil surfaces. Means are also provided for twisting portions of the airfoil about an axis extending through the root end, and means for pivoting the spar to fold against the fuselage.

5 Claims, 11 Drawing Figures

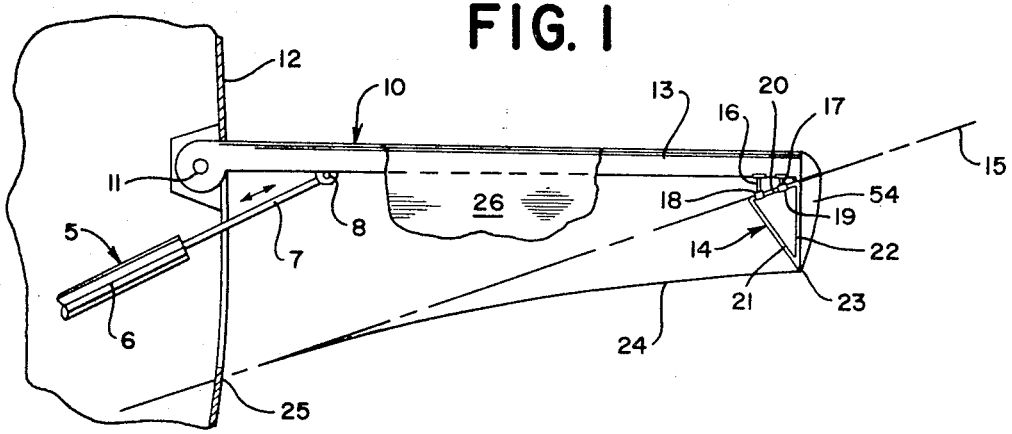
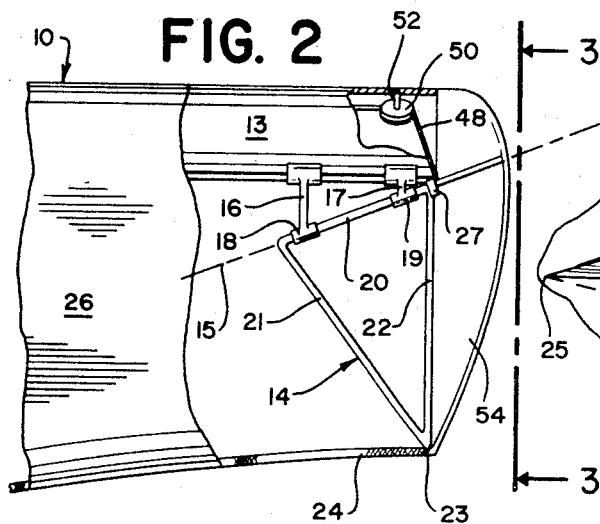
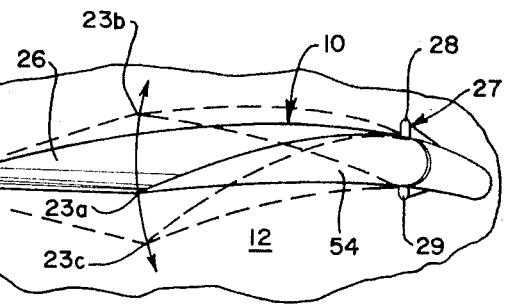
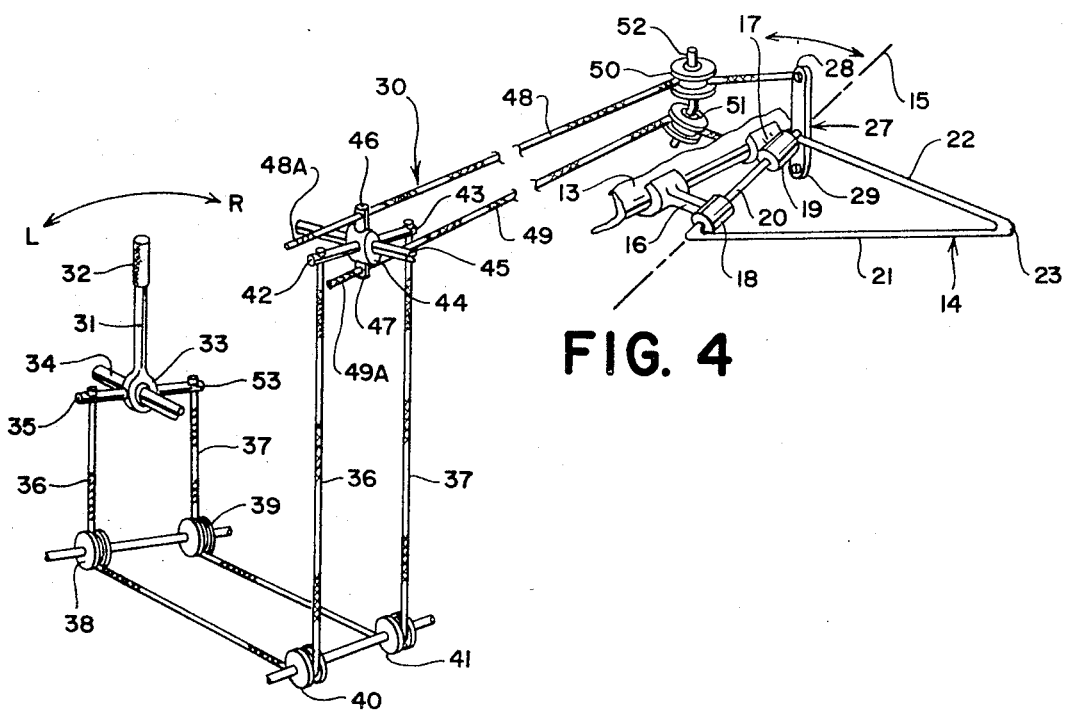

Patented July 3, 1973  3,743,218

SEMI-RIGID AIRFOIL FOR AIRBORNE VEHICLES

This application is a division of parent application, Ser. No. 740,895, filed June 28, 1968, now U. S. Pat. No. 3,599,904.

This invention relates to semi-rigid airfoils, or sailwings, and more particularly to apparatus for warping and/or folding semi-rigid airfoils.

The use of airfoils of semi-rigid construction in which a rigid spar supports a flexible wing form dates back to the earliest successes enjoyed by the pioneers of flight. The predominant use of rigid winged aircraft in present commercial flights is well known. Ailerons presently perform functions, such as roll control, which were accomplished by warping or twisting of the former flexible wings in order to create unequal or opposing lifting forces on opposite sides of the aircraft.

Rigid wings presently known to the art are considerably more expensive to fabricate than semi-rigid or flexible winged aircraft. Costs of materials are necessarily passed on to the purchaser of such craft, which in many cases may be one of the growing numbers of persons who own a small plane for pleasure or business.

Known aircraft having a high aspect ratio, such as gliders, have rigid wings which must be disassembled such that the aircraft can be transported between the place of storage and the airport. Such disassembly includes detaching the wing from the fuselage, this in most cases requiring the work of at least two persons. Considerable time is consumed and often tools are required to perform the operation.

It is an object of the present invention to provide a semi-rigid airfoil of the sailwing type which is foldable and capable of being warped at will in predetermined magnitudes.

Another object of the present invention is to provide a warping apparatus for a semi-rigid airfoil of the sailwing type.

A further object of the present invention is to provide a semi-rigid airfoil of the sailwing type for use with and as an extension of a fixed and rigid airfoil, the semi-rigid airfoil being foldable such that the leading edge thereof forms the wing tip fairing of the fixed rigid wing when in a folded position.

A yet further object of this invention is to provide a semi-rigid airfoil of the sailwing type for use with fixed wings as above, including apparatus for warping the form of the semi-rigid airfoil.

Another object of this invention is to provide a folding semi-rigid airfoil of the sailwing type for use with a helicopter wherein the semi-rigid airfoil provides means for increasing high-speed performance of the helicopter by substantially unloading the rotor of the helicopter during forward motion of the craft.

A yet further object of the present invention is to provide a semi-rigid airfoil of the sailwing type for use with a helicopter or other vertical take-off and landing aircraft wherein such airfoil includes means for warping or twisting the form thereof.

Another object of the present invention is to provide a folding semi-rigid airfoil of the sailwing type in combination with a lifting body or a spent rocket booster or missile, the folding airfoil providing means for maintaining a relatively shallow glide angle of the lifting body.

The present invention fulfills the aforementioned objects and overcomes limitations and disadvantages of prior art solutions to existing problems by providing a flexible semi-rigid airfoil of the sailwing type which may be folded and/or warped, and further providing specific applications or uses of the sailwing. These applications include the use of the foldable and warpable sailwing structurally combined with rigid wings of a fixed-wing aircraft; a helicopter; a lifting body or a missile or rocket booster; or other aerodynamic structures.

The airfoil, in a preferred embodiment, includes a hinged rigid spar defining the leading edge of the sailwing. A cable extending between a root point and the extremity of the airfoil defines the trailing edge of the sailwing. Warping means for twisting portions of the airfoil about an axis extending through the root point includes a truss hingedly secured to the spar for pivotal movement about the hinge axis extending through the root point. A control stick for use by the pilot of the craft is interconnected with the truss by a plurality of cables and pulleys responsive to movement of the control stick. Thus movement of the control stick causes the truss to pivot about the hinge axis, thereby changing the lifting forces on the airfoil. The pivoting of the truss according to the present invention is accomplished with substantially no change in the trailing edge cable tension throughout the angular range of the warp, this resulting in minimal control forces being required to produce the warp.

In embodiments of the present invention wherein the semi-rigid airfoil is structurally combined with fixed rigid wings of an aircraft, the aspect ratio of the wing is considerably increased with a relatively small addition of weight. A retractable wing tip comprising an airfoil of the sailwing type is hingedly mounted to a conventional hard wing. The spar of the sailwing forms a wing tip fairing when retracted.

In embodiments of the present invention wherein a folding semi-rigid airfoil of the sailwing type is structurally combined with a helicopter or other vertical take-off and landing vehicles, high forward speed performance of the craft is substantially increased by the unfolding or deployment of a foldable sailwing once the craft is lifted to the desired altitude and forward speed is experienced. The sailwing is maintained in the folded or retracted position during lift-off in order to eliminate high downloads which would be produced if the airfoil were in the rotor downwash. Similarly, the semi-rigid airfoil can be retracted in order to avoid aerodynamic blockage to the rotor system in autorotational descent.

The embodiments of the present invention employing a foldable and warpable sailwing in structural combination with a lifting body or a missile or rocket booster, include means for enabling a shallow glide and lower speed landing of such lifting bodies after reentry from extraplanetary spatial vacuum into the atmosphere. The sailwing is folded in a stowed condition within the lifting body until reentry of the lifting body into the atmosphere, whereupon the sailwings are deployed. Deployment is accomplished, in one embodiment of the present invention, by means of solid propellant rockets disposed at the tips of the semi-rigid airfoils which, in a preferred embodiment of the invention, will be interconnected to prevent the deployment of one airfoil without the other, and to further cause both airfoils of an aircraft to be deployed simultaneously. The trust of the rockets carry each airfoil from a stowed position to an unfolded or fully operable position. It is within the scope of the present invention to include means for controlling the descent of the lifting body through the atmosphere such that a precise descent pattern or flight path may be predetermined.

The invention will be more clearly understood from the following description of specific embodiments of the invention together with the accompanying drawings, wherein similar reference characters denote similar elements throughout the several views, and in which:

FIG. 1 is a fragmentary schematic plan view of wing warping apparatus according to the present invention;

FIG. 2 is an enlarged fragmentary sectional plan view of a tip portion of the wing of FIG. 1;

FIG. 3 is a schematic end view of the wing tip shown in FIG. 2, looking along lines 3—3 of FIG. 2;

FIG. 4 is a fragmentary schematic perspective view of a warping control system according to the present invention;

FIGS. 1 and 2 show a semi-rigid flexible airfoil of the sailwing type. For purposes of illustration, the preferred embodiment of the sailwing airfoil shown in FIG. 1 is described as a wing 10 for an airborne body such as an aircraft.

Figure 5:
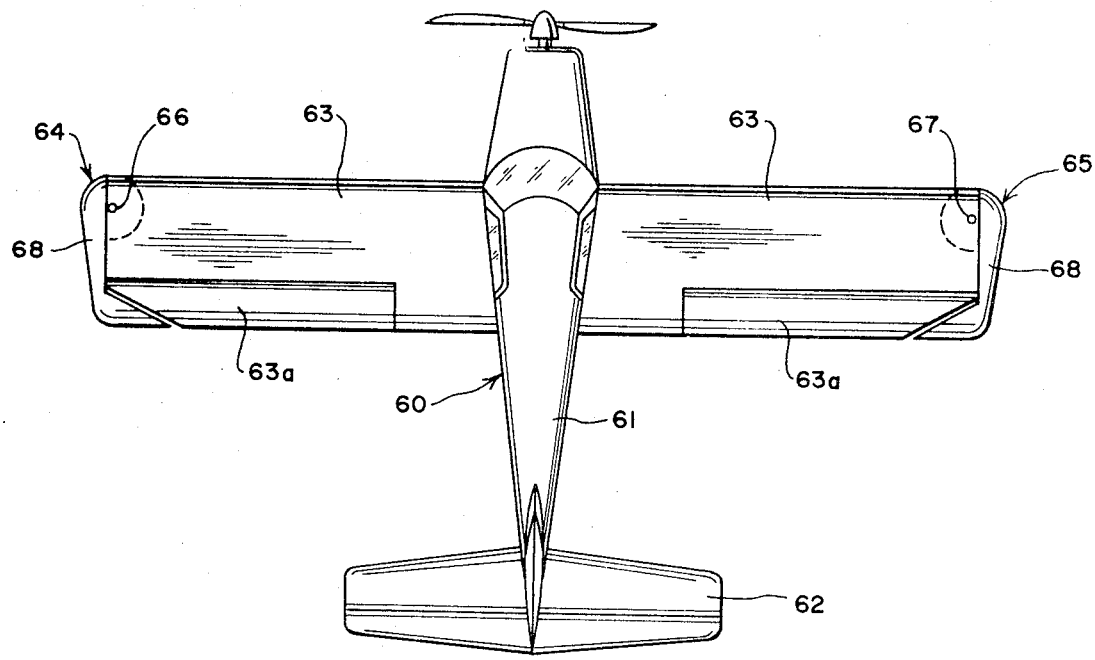
FIG. 5 is a top plan view of an aircraft employing sailwing type tips according to the present invention with the tips shown in a retracted position.

The wing assembly 10 shown in FIG. 1 includes a rigid spar 13 which is hinged at point 11 to fuselage 12 of the vehicle with which wing 10 is to be used. Rigid spar 13 defines the leading edge of the airfoil 10 and is hollow in the preferred embodiment shown in FIG. 1. The material of spar 13 may be wood, metal or other suitable material. A triangular-shaped truss assembly 14 is secured on its base leg 20 for pivotal movement about a hinge axis 15 near the end of spar 13 by a pair of support struts 16 and 17. Support struts 16 and 17 are formed with bearing portions 18 and 19 respectively, at one end of each. The opposite ends of these struts are secured, such as by welding, to spar 13.

Truss assembly 14 is formed in a triangular shape, although any suitable polygonal configuration is within the scope of the present invention. The base, or first, leg 20 of the truss assembly is disposed coaxially with respect to hinge axis 15 and is journaled within bearing portions 18 and 19 of support struts 16 and 17, respectively. The second and third legs 21 and 22 of the truss 14 extend from opposite ends of first leg 20 and terminate in a tip portion 23. A wing tip 54 is secured along one of its edges to the leg 22 of the truss and therefore moves with the truss as it pivots within the bearings 18 and 19.

A cable 24 has one end secured to the tip 23 of the truss 14 and its other end to a root point 25 on the fuselage 12. Cable 24 defines the trailing edge of airfoil 10. A piece of flexible material 26 extends from a first edge forwardly around the spar 14 without attachment thereto so as to allow wing warping and thence back to its first edge where it is seamed. The seam constitutes the trailing edge of the flexible material and is formed in the shape of a catenary arc for providing chordwise tension in a direction parallel to the central longitudinal axis of the aircraft supporting the airfoil. The seam is secured to cable 24, such as by providing eyelets or lacing secured to the seam through which cable 24 is passed. Material 26 is preferably made of dacron sailcloth impregnated with silicon, but may also be canvas, plastic or other suitable flexible material and it defines the shape of the airfoil. The tension in wing material 26 is controlled by varying the tension in cable 24.

As shown in FIG. 1, the hinge axis 15 for the truss 14 extends coaxially with respect to the base leg 20 and thereafter through the fuselage root point 25. A catenary defined by cable 24 extends from truss tip portion 23 tangentially with respect to and terminating at root point 25. Thus, pivoting or rotation of truss assembly 14 about its hinge axis 15 results in constant tension in cable 24 since the distance between the tip 23 and root point 25 remains constant during all angles of warp. It is the maintenance of constant tensile stresses in cable 24 which minimizes control forces. This is described below.

As seen best in FIGS. 2 and 4, horn member 27, having an upper end 28 and a lower end 29 is rigidly secured, such as by welding, to an extension of the truss base leg 20. The portion of the horn between the base leg 20 and each of its ends 28 and 29 defines a lever arm which gives rise to a mechanical advantage when forces are exerted on either of these ends to effect pivoting of truss assembly 14 about hinge axis 15. Of course the length of this lever arm may be of different lengths.

FIG. 4 shows a preferred mechanism for controlling the magnitude of pivotal movement of truss assembly 14, and thus the warping of wing assembly 10. The control mechanism 30 includes a control stick 31, having a handle 32 at one end and a hub 33 at the other end. The hub 33 is journalled into a support member 34 which can be a fixed supporting member on the aircraft, so that the elevation of the hub is fixed. The control stick can be moved around support 34 from left to right. Alternatively, the control stick 31 may be fixed to support member 34 with remote portions of member 34 being journalled in bearings.

A pair of arms 35 and 53 are fixed to hub 33 and extend radially from the hub and coaxially with respect to each other. Control cables 36 and 37 are secured to arms 35 and 53 respectively, and extend around pulleys 38 and 39. The cable 36 passes around pulleys 38 and 40 to an arm 42 which is fastened to a hub 44. Similarly, cable 37 passes around pulleys 39 and 41 to an arm 43 on the hub 44. Arms 42 and 43 are secured to and extend radially from hub 44 which, in turn, is fixedly secured to a support rod 45 which is mounted on the vehicle body.

A second pair of arms 46 and 47 are also secured to hub 44 and extend radially therefrom and coaxially with respect to each other. The axes of arms 42, 43 and 46, 47 are preferably prependicular with respect to each other.

A second pair of control cables 48 and 49 are secured to arms 46 and 47, respectively. This pair of cables extends through spar 13, around pulleys 50 and 51, respectively, which are also located within the spar. The ends of the cables 48 and 49 are secured to the upper and lower ends of 28 and 29 of the horn member 27. Pulleys 50 and 51 are mounted for rotation to a support bar 52, which is secured to spar 13 and located in the spar interior.

FIG. 4 is a fragmentary view of the control system and shows only one cable arrangement for controlling one wing airfoil. Extensions 48A and 49A of cables 48 and 49, respectively, are also shown broken off or discontinued. It should be understood that a symmetrical or mirror image of the above-described pulley and horn member arrangement exists for an airfoil (not shown) on the opposite side of the aircraft. Cable 48 and extension 48A, while shown coaxially with respect to each other, are each secured to arm 46. Similarly, cable 49 and extension 49A are each secured to arm 47. Thus, pivoting of hub 44 by manipulation of control stick 31 will cause opposite movement of the horn members on opposite sides of the vehicle. This necessarily results with the structure of FIG. 4 because increases in tension in either of cables 48 or 49 results in decreases in tension or slackening in their counterparts 48A or 49A.

In operation of the bridle control system of FIG. 4, the pilot moves control stick 31 either to the right or left (R or L in FIG. 4) to effect warping. As an example, movement of control stick 31 to the right lifts arm 35 or hub 33 which results in increasing tension in control cable 36. This causes a downward pivotal movement of arm 42 on hub 44 about the axis of support rod 45. The resulting pivoting of hub 44 causes an increase in tension in control cable 48, thereby moving upper end 28 of horn member 27 toward pulley 50. Movement of horn member 27 in this direction results in pivoting of truss assembly 14 upward with an associated warping of the form of wing assembly 10. In a like manner, movement of the control stick 31 to the left produces tension in cable 37 which acts to move arm 43 of hub 44 down, thereby applying tension to cable 49 and moving the truss 14 downward.

FIG. 3 shows several airfoil configurations which can be achieved by movement of the control system and subsequent operation of the warping control. Reference numeral 23a represents the location of truss tip 23 of the truss when in an unwarped, or neutral, position. Upon movement of control stick 31 to the right as described above, truss tip 23 is pivoted upward, for example to the position designated 23b in FIG. 3. Movement of control stick 31 to the left moves truss tip 23 down, for example to the position shown in 23c. For the case where truss tip portion 23 is moved to the position designate 23c from position 23a, an increase in the angle of attack is achieved, resulting in a tendency of the airfoil to lift. For the case where truss tip portion 23 is moved to the position designated 23b from position 23a, there is a tendency of the airfoil to sink. By upward warping of wing 10 and downward warping of the wing opposite wing 10, not shown, the unequal lifting forces on the respective wings result in rotation of the aircraft about its central longitudinal axis. Of course it is within the scope of the present invention to include warping in selected amounts within the extrememost positions 23b and 23c schematically shown in FIG. 3, and to further provide a locking of the airfoil at prese-lected magnitudes of warp. It is also obvious from FIG. 3 that the distance between any of points 23a or 23b or 23c and root point 25 remains substantially constant throughout the warping operation, since the locus of points defined by tip 23 during its movement is a curve of substantially constant radius.

In the preferred embodiment of the control structure shown in FIG. 4, upward movement of tip portion 23 in one wing will necessarily result in downward movement of the tip portion of the aircraft's opposite wing, since increases in tension in control cable 48, for example, will be accompanied by decreases in tension in its counterpart. It is also possible to include individual controlling of warping for each airfoil (wing) or sailwing when two or more are used.

Deployment of wing assembly 10 from a folded to an unfolded position, the latter position illustrated in FIG. 1, is accomplished by a hydraulic cylinder assembly 5 which includes a cylinder 6 and a push rod 7. The cylinder is secured to the fuselage 12 and the rod is secured to spar 13 at point 8 such that its reciprocating movement moves the wing assembly 10. Thus, on rod 7 retracting into cylinder 6, wing assembly 10 is folded in a pivoting motion about hinge point 11 in toward the fuselage. In the deployed position shown in FIG. 1, hydraulic pressure maintains rod 7 in an unyielding and rigid manner against loads upon wing assembly 10 tending to cause pivotal movement of the assembly about point 11. The control circuit for the cylinder assembly 5 is not shown, but it can be of any suitable conventional construction. It is within the scope of the present invention to include other means for deploying folding wing assemblies, such as over-center-lock linkage.

Figure 6:
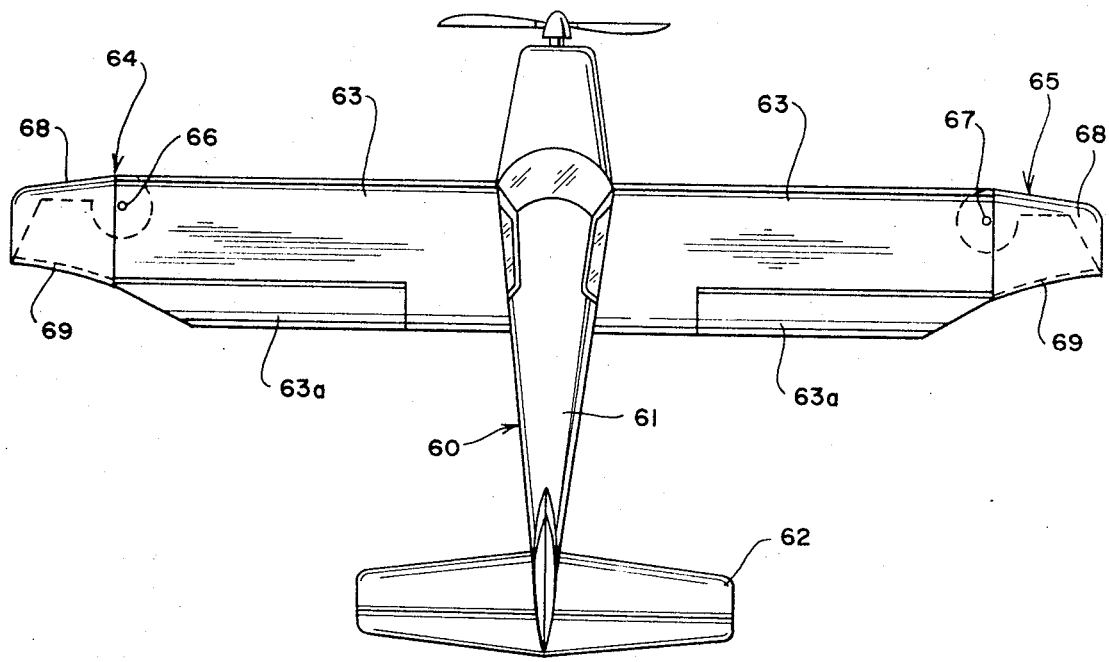
FIG. 6 is a top plan view of the aircraft shown in FIG. 5 wherein the sailwing tips are in a deployed position.

FIGS. 5 and 6 show retractable sailwing airfoil tips used in combination with conventional "hard" wings of an aircraft. This arrangement permits the wing area and aspect ratio to be altered in flight by an amount corresponding to the area occupied by the sailwing tips. It is intended that the airfoil and control means desscribed above for FIGS. 1–4 be characteristic of the sailwing tips described in FIGS. 5 and 6, and the other applications described below in FIGS. 7–11.

In FIGS. 5 and 6 an aircraft 60 includes a conventional fuselage portion 61, tail portion 62 and two hard wings 63 with ailerons 63a. Sailwing-type tip assemblies 64 and 65 are hingedly secured to each of the wings 63 at points 66 and 67.

Sailtip assemblies 64 and 65 are similar in structure to the wing assembly 10 of FIGS. 1–4 already described. Only tip 64 is described since the other tip 65 is similar. A rigid spar 68 (FIG. 6) defines the leading edge of either of the tips 65 or 64, and a trailing edge cable 69 defines the trailing edge. In the retracted position shown in FIG. 5, spar 68 becomes the wing tip fairing of wing 63. By deploying the sailwing tip assemblies 64 and 65, the aspect ratio and wing area are increased, providing both a lower wing loading and increased induced drag efficiencies. The term "aspect ratio," as used herein, is the ratio of wing span to the mean chord dimension of the wing.

The sailtip assemblies 64 and 65 can be deployed by the hydraulic piston and cylinder arrangement disclosed for wing assembly 10. During flight at relatively high speeds, the pilot of the aircraft 60 will maintain the sailtip assemblies 64 and 65 in a retracted position, as shown in FIG. 5. With the tips retracted, the requirements of low aspect ratio at such high speeds is met. At lower flight speeds, the sailtip assemblies 64 and 65 are deployed thereby increasing the aspect ratio and wing area (See FIG. 6). Using the present invention, induced drag reductions of up to 40 percent are possible for landings with low aspect ratios since flight with the sailtip assemblies extended will result in an increased aspect ratio with a resulting decrease in airflow downwash angle. Thus the drag caused by lift and induced by the downwash resulting from this lift will also decrease. The increased wing area provides lower stall speeds for landing of the aircraft.

The semi-rigid airfoil, or sailwing, according to this invention can also be used as an auxiliary wing for a helicopter. It is known that the cruise and high speed performance of a helicopter can be substantially increased by the addition of a relatively small wing to the craft. The function of the semi-rigid wing in this case is to substantially unload the rotor, thereby permitting more efficient use of available horsepower, and to provide an airfoil capable of being folded out of the downwash of the rotor.

Figure 7:
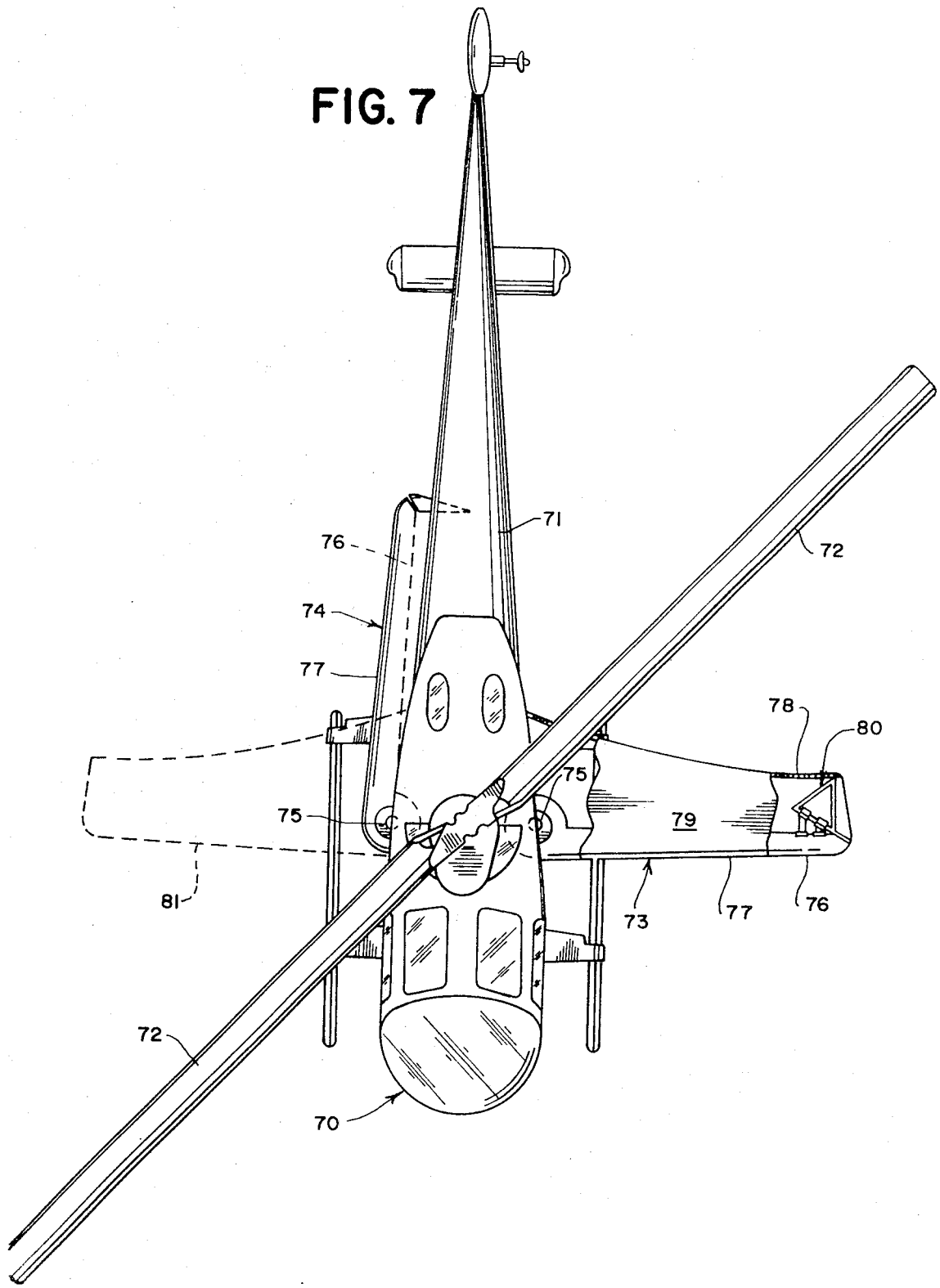
FIG. 7 is a top plan view of a helicopter equipped with foldable and warpable sailwings according to the present invention.
Figure 8:
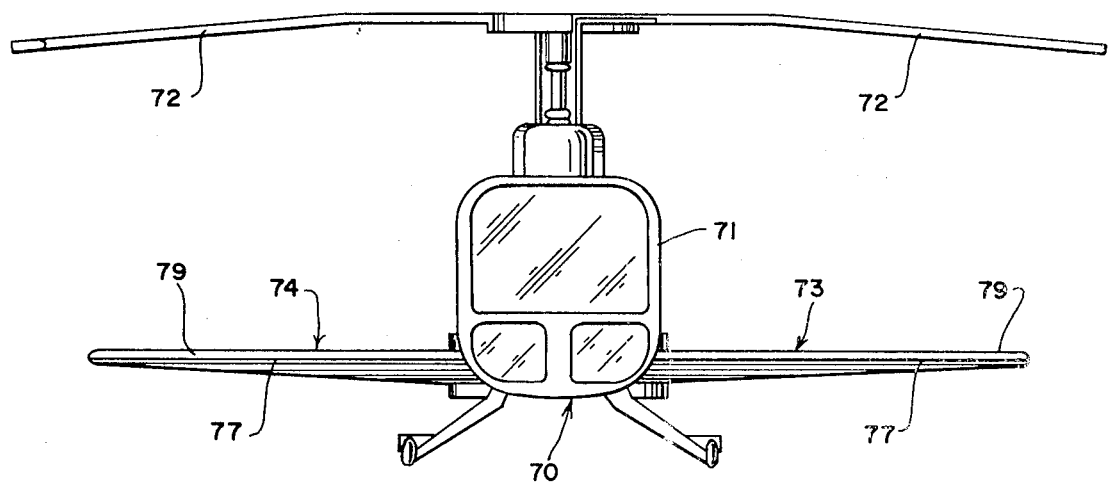
FIG. 8 is an elevational view of the helicopter shown in FIG. 7 in which the sailwings are deployed.

FIGS. 7 and 8 show a helicopter 70 with the conventional fuselage 71 and rotor 72. Helicopter 70 is equipped with two semi-ridig airfoil or sailwing assemblies 73 and 74, each assembly capable of folding back out of the downwash of the rotor. The folded position is illustrated for sailwing assembly 74, while a fully deployed or unfolded position is illustrated for assembly 73 in FIG. 7. The deployed position of assembly 74 is shown by the dotted lines of FIG. 7. Sailwing assemblies 73 and 74 each pivot about hinge point 75. Each of sailwing assemblies 73 and 74 is structurally similar to wing assembly 10 described for FIG. 1 above. A rigid forward spar 76 defines leading edge 77. Trailing edge cable 78 defines the trailing edge of assembly 73. Flexible material 79 covers spar 76 and is secured to cable 78 to form the airfoil surface. A truss assembly 80 functions in much the same manner as truss assembly 14 described for FIG. 1 where warping of sailwing assembly 73 is desired.

Folding and unfolding of the auxiliary wing assemblies 73 and 74 are accomplished by a hydraulic cylinder assembly (not shown) or other suitable means. The relative easy foldability of assemblies 73 and 74 facilitates storage in a relatively small space in the fuselage, the flexible material 79 folding in an accordian-like fashion.

In operation, sailwing assemblies 73 and 74 are retracted for low speed and hovering flight regime and also for autorotational descent. For cuising and high speed flight, the sailwing assemblies are deployed from their folded position. In a preferred form of the invention the sailwing assemblies are preferably made capable of being folded flush with the sides of the fuselage by providing receptacle wells in the sides of the fuselage. FIG. 8 also illustrates the appearance of helicopter 70 with sailwing assemblies 73 and 74 fully deployed.

Figure 9:
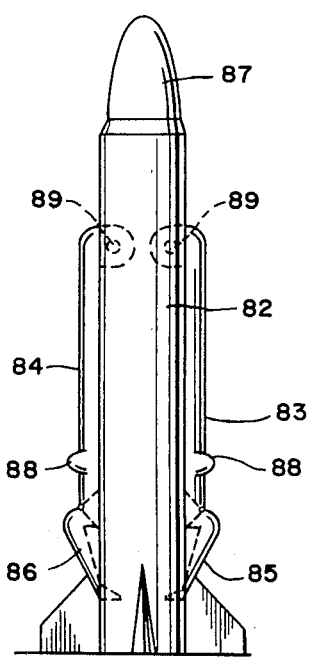
FIG. 9 is an elevational view of a rocket equipped with folding sailwings according to the present invention.

The semi-rigid airfoil or sailwing of the present invention also can be used to allow recovery of and controlling the post-reentry characteristics of spent rocket booster payloads, such as the type used in known defense or aerospace missions. FIG. 9 shows a booster 82 equipped with sailwings 83 and 84 folded along and into the sides of the booster main structure, as would be the case prior to or during launch. The spars of the sailwings are shown in FIG. 9. Hinged tips 85 and 86 which form the wingtip fairing for sailwings 83 and 84, respectively, similary fold along sides of the booster. An inflatable nose fairing 87 permits mating of the nose of the booster with its payload without interference.

Figure 10:
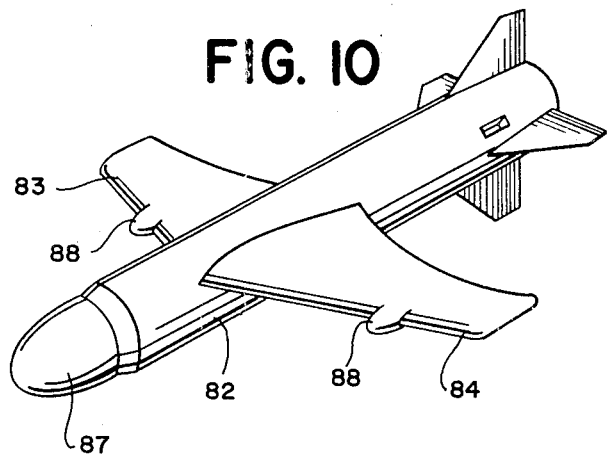
FIG. 10 is a perspective view of the rocket shown in FIG. 9 in which the sailwings are deployed.

Solid propellent rockets 88 are secured to each tip of sailwings 83 and 84 or other suitable linkage to provide the forces necessary to deploy sailwings 83 and 84 from the folded position shown in FIG. 9 to the fully deployed position shown in FIG. 10, deployment including a pivoting of the sailwing assemblies about hinge points 89. The thrust initiation of the rocket is either pre-programmed or controlled by signals from a remote location.

In operation, after burn-out, the sailwing assemblies 83 and 84 are deployed by the rockets 88 and the nose fairing 87 would be automatically inflated, thereby transforming the separated booster into a glider whose flight path and landing area is capable of control by conventional electro-mechanical remote control devices operated from a ground installation, for exmaple. The inflatable nose fairing 87 reduces fuselage drag of the craft. The relatively expensive booster can be recovered without damage, facilitating its possible re-use.

Figure 11:
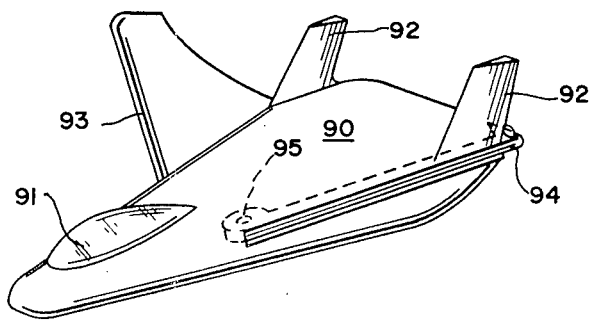
FIG. 11 is a perspective view of a lifting body in the form of an extraplanetary vehicle equipped with folding sailwings according to the present invention.

FIG. 11 shows an extraplanetary reentry vehicle or lifting body 90 having a shape determined by thermodynamic, hypersonic, supersonic and subsonic aerodynamic parameters. Lifting body 90 provides an astronaut with a vehicle capable of making controlled glide-type landings on terra firma rather than parachuting into the sea. A transparent bubble 91 provides means through which the astronaut may see to determine whether changes in flight path are necessary. Fins 92 aid in stabilizing the craft 90 during its descent.

Folding sailwing assemblies 93 and 94 of the type previously described for FIG. 1 are hinged about hinge points 95 such that each sailwing will retractably fit into a slot in the sides of the lifting body. A major advantage of the use of such semi-rigid airfoils or sailwings is the fact that the shape of lifting body 90, as determined by the above parameters, may be retained for all flight regimes other than merely the subsonic glide phase. In this latter regime the sailwings are deployed in flight, thereby permitting flight characteristics approaching those of a conventional airplane, with associated favorable handling qualities.

The embodiments of the invention particularly disclosed are presented merely as examples of the invention. Other embodiments, forms or modifications of the invention coming within the proper scope of the appended claims will of course readily suggest themselves to those skilled in the art.

What is claimed is:

1. Aircraft apparatus, comprising a lifting body, an airfoil supported by the body including a rigid leading edge, a cable defining a trailing edge, and flexible material engaging said leading edge and extending for the entire distance between said leading edge and the cable for defining portions of the form of the airfoil; said cable being secured at a root end thereof to the body at a predetermined point, means including said cable for varying the warp of the airfoil, and means for moving said airfoil from a first retracted position to a second postion wherein said airfoil is deployed.

2. Aircraft apparatus according to claim 1, wherein said lifting body has a slot for receiving at least a portion of said airfoil when said airfoil is in the first retracted position.

3. Aircraft apparatus according to claim 1, wherein said means for moving said airfoil includes a hinge point on said lifting body about which said airfoil is hinged.

4. Aircraft apparatus according to claim 1, further comprising at least one fin extending upward from the aft portion of said lifting body.

5. Aircraft apparatus according to claim 1, further comprising a transparent bubble located on said lifting body.

* * * * *